United States Patent [19]
Ozarski

[11] Patent Number: 6,111,907
[45] Date of Patent: *Aug. 29, 2000

[54] LASER CHAMBER INSTALLATION IN AND REMOVAL FROM A LASER SYSTEM HOUSING

[75] Inventor: Robert G. Ozarski, Poway, Calif.

[73] Assignee: Cymer, Inc., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/271,040

[22] Filed: Mar. 17, 1999

[51] Int. Cl.[7] .................................................. H01S 3/08
[52] U.S. Cl. .............................. 372/107; 372/57; 372/98
[58] Field of Search ................................ 372/18, 22, 27, 372/99, 19, 107

[56] References Cited

U.S. PATENT DOCUMENTS

| | | | |
|---|---|---|---|
| 3,683,300 | 8/1972 | Hohenstein | 331/94.5 |
| 3,768,035 | 10/1973 | Zar | 331/94.5 |
| 4,700,044 | 10/1987 | Hokanson et al. | 219/121 LC |
| 4,723,254 | 2/1988 | Turner | 372/59 |
| 4,959,840 | 9/1990 | Akins et al. | 372/57 |
| 4,977,573 | 12/1990 | Bittenson et al. | 372/81 |
| 5,247,537 | 9/1993 | Kaiser et al. | 372/107 |
| 5,450,436 | 9/1995 | Mizoguchi et al. | 372/59 |
| 5,463,650 | 10/1995 | Ito et al. | 372/57 |
| 5,657,334 | 8/1997 | Das et al. | 372/33 |
| 5,662,374 | 9/1997 | Wheeler | 296/184 |
| 5,663,977 | 9/1997 | Fujimoto et al. | 372/55 |

FOREIGN PATENT DOCUMENTS

2847648  11/1998  Japan .

*Primary Examiner*—Leon Scott, Jr.
*Attorney, Agent, or Firm*—John R. Ross, Esq.

[57] ABSTRACT

A system for providing support for the movement of a laser chamber of a laser system during the installation and removal of the laser chamber from the laser system housing. The system includes a rail assembly that is retractable and extendible from the laser system housing and provides support for moving the laser chamber between an operating position within the housing and a position outside of the housing for removal. The rail assembly is retractable to reside within the housing when not in use. The system may also include at least one actuator for controlling the movement of the laser chamber in a direction having a vertical component. Actuator types that may be used include rotary, piston cylinder, hydraulic, pneumatic, and/or electrical mechanical. One type of rail assembly includes opposing rail structures that retract and extend by moving laterally out from the housing or by pivoting out from the housing. The system may be implemented with a gas laser system such as an excimer laser system.

34 Claims, 8 Drawing Sheets

LASER CHAMBER INSTALLATION IN AND REMOVAL FROM A LASER SYSTEM HOUSING

BACKGROUND OF THE INVENTION

1. Field of the Invention

This invention relates in general to laser systems and in particular to the installation and removal of a laser chamber in a laser system housing.

2. Description of the Related Art

Gas laser systems, such as excimer lasers, conventionally include a laser chamber or discharge chamber. A mixture of gases (such as halogen, rare gases, helium, and neon) are injected into the chamber and excited by a potential between two electrodes to produce a laser beam. Examples of gas lasers are found in Fujimoto et al., U.S. Pat. No. 5,663,977; Bittenson et al. U.S. Pat. No. 4,977,573; Turner, U.S. Pat. No. 4,723,254; Das et al., U.S. Pat. No. 5,657,334; and Akins et al., U.S. Pat. No. 5,959,840, all of which are incorporated by reference in their entirety.

One problem with such a laser system is that the laser chamber must be serviced regularly. With some laser chambers weighing over 140 pounds, removing the laser chamber from the laser system housing or installing the laser chamber in the housing can be physically challenging for service technicians. In addition, the weight of the chamber may exceed some organizations handling regulations.

To aid in the removal and installation of a laser chamber in the laser system housing, rails are bolted on to the laser system housing. The laser chamber is then moved out from the laser housing on the bolt-on rails wherein a technician(s) lifts or lowers the laser chamber onto a service cart. One problem with such a system is that, when not in use, the bolt-on rails need to be stored in a location that is accessible and convenient to a service technician and yet do not interfere with the operation of the laser system. Another problem is that wrenches or other tools are typically needed to install the bolt on rails.

What is desirable is a system to reduce the manual effort and increase the convenience in installing or removing a laser chamber in a laser system housing.

SUMMARY OF THE INVENTION

A system is disclosed which advantageously reduces the manual effort in installing or removing a laser chamber from a laser system housing. The laser system is provided with actuators for raising and lowering the chamber during installation and removal. The laser system is also provided with a rail assembly that is retractable and extendible in the laser system housing making the installation and removal of the laser chamber more convenient.

In one aspect of the invention, a laser system includes a housing for housing a laser chamber and a rail assembly physically coupled to the housing. The rail assembly being extendible and retractable between a retracted position, where the rail assembly resides at least substantially within the housing, and an extended position, where the rail assembly extends out from the housing such that the rail assembly provides support for a laser chamber at a location in which the laser chamber is at least substantially outside of the housing.

In another aspect of the invention, a laser system includes a laser chamber, a housing for housing the laser chamber, and an actuator physically coupled to the housing. The actuator provides a force for controlling the movement of the chamber in a direction having a vertical component during the installation or removal of the laser chamber with respect to the housing.

In another aspect, the invention includes a method for moving a laser chamber with respect to a laser system housing. The method includes moving the laser chamber supported by a moveable assembly coupled to the housing from its operating position in the housing towards an outside of the housing. The method also includes lowering the chamber, using the moveable assembly, from a first elevation to a second elevation wherein at least one actuator physically coupled to the assembly provides a force to controllably lower the chamber.

In another aspect of the invention, a laser system includes a housing and means for providing for the movement of a laser chamber between a location within the housing and a location at least substantially outside of the housing during the installation or removal of the laser chamber.

BRIEF DESCRIPTION OF THE DRAWINGS

The present invention may be better understood, and its numerous objects, features, and advantages made apparent to those skilled in the art, by referencing the accompanying drawings.

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1:
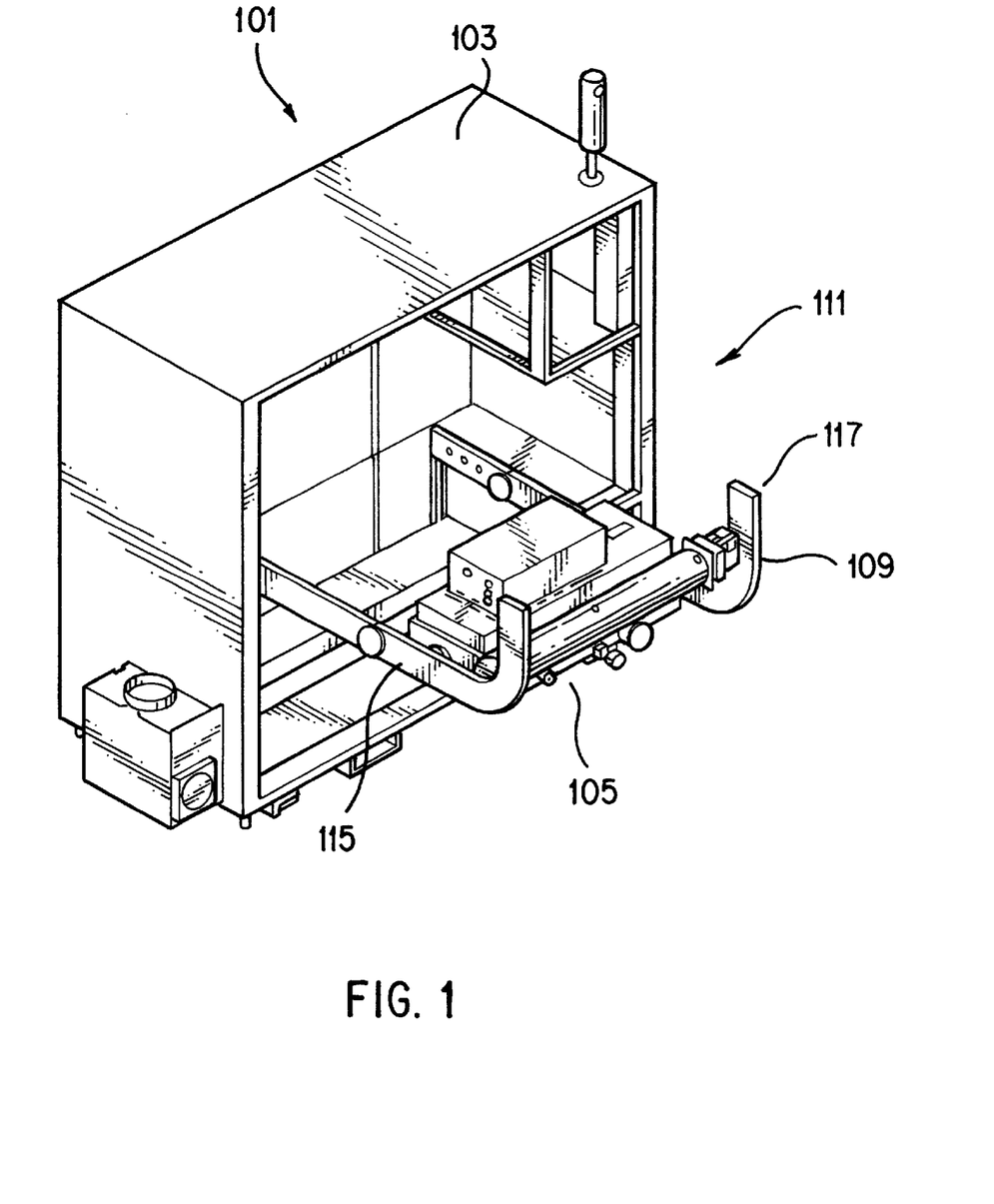
FIG. 1 is a perspective view of a laser system according to one embodiment of the present invention.

FIG. 1 is a perspective view of a laser system according to one embodiment of the present invention. Laser system 101 is an excimer laser system that includes a laser chamber 105 shown in FIG. 1 in a location outside of laser system housing 103 supported by a rail assembly 109. When in an operating position, laser chamber 105 resides within a laser chamber compartment of laser system housing 103. Rail assembly 109 includes two opposing rail structures 115 and 117 extending out from the front side 111 of housing 103 for providing support for the laser chamber 105 during its installation and removal from housing 103. Rail structures 115 and 117 are physically attached to structures of housing 103 such as frame members. The physical attachment of rail structures 115 and 117 to housing 103 is sufficient to support the weight of laser chamber 105 in the position shown in FIG. 1. Rail structures 115 and 117 are retractable from their position shown in FIG. 1 such that they may reside within housing 103 when not in use. Housing 103 may also be referred to as a cabinet or platform. Housing 103 also houses other conventional laser system components such as a high voltage power supply, a laser resonator, a front optical system, a rear optical system, exhaust and mixing equipment, gas tanks, and compressor head. One example of a gas laser system is the ECS 5000 sold by the CYMER, INC. of San Diego Calif.

Figure 2:
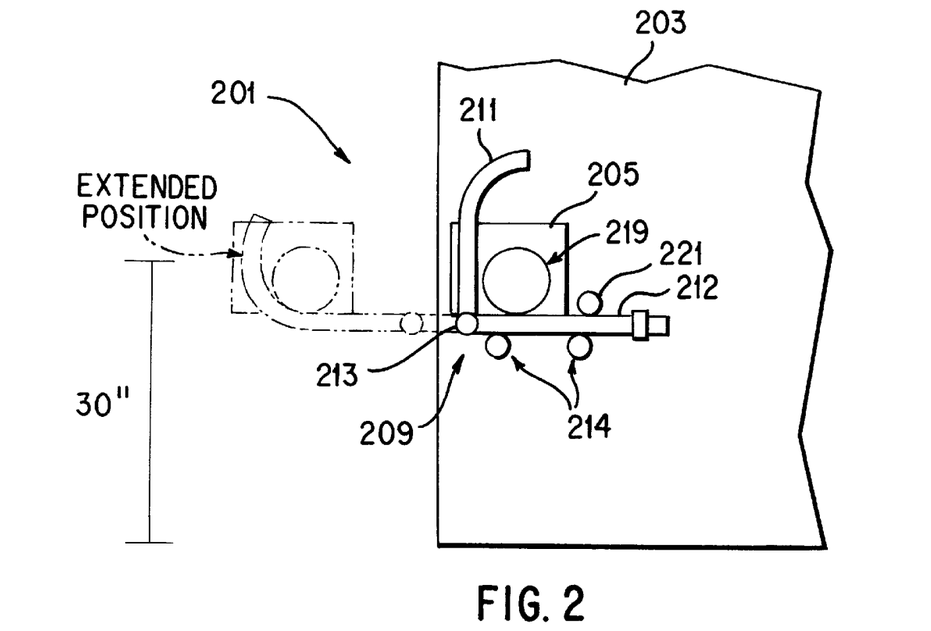
FIG. 2 is a side view of a laser system according to one embodiment of the present invention.

FIG. 2 shows a transparent, side view of a laser system including a laser chamber and rail assembly according to one embodiment of the present invention. Laser chamber 205 is shown in solid lines residing within laser system housing 203 (such as in an operating position) and shown in phantom in a position residing outside of housing 203. Laser system 201 also includes a rail assembly 209 (to be described later) which provides support for the movement of laser chamber 205 into and out of housing 203. Rail assembly 209 includes two opposing rail structures located on opposite sides of housing 203 with one of the rail structures shown in FIG. 2. The rail structure shown includes a straight rail 212 and a curve rail 211 coupled to the straight rail at hinge 213.

To extend the rail system 209 from the retracted position shown in solid lines to an extended position shown in phantom, the curved rails are pivotally moved on the hinges (with hinge 213 shown) by 90 degrees counter clockwise (relative to the view shown in FIG. 2) to a position where the curved rails extend out from the system housing in a horizontal orientation (similar to the orientation shown in phantom). Rail assembly 209 is pulled out from the housing on rollers 214 rotatably mounted to housing 203. Pulling out rail assembly 209 also moves laser chamber 205 with respect to housing 203. Laser chamber 205 includes roller bearings 219 for rolling the chamber on the rail assembly. Laser chamber 205 is rolled out to its position shown in phantom. Laser system housing 203 also includes rollers (with 221 shown) rotatably mounted to housing 203 above the straight rails (212 shown) for providing a force downward on the rail structures to retain the straight rails in a horizontal orientation when the rail assembly is in the extended position. With other laser system housings, rollers 214 would be captured within the straight rails.

Figure 3:
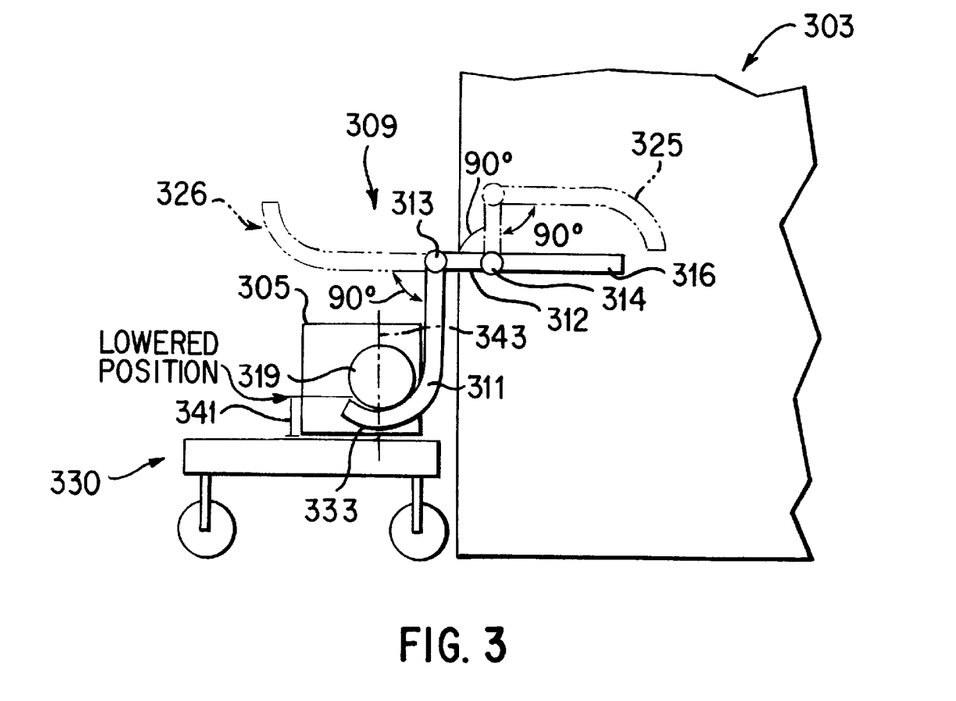
FIG. 3 is a side view of a laser system according to one embodiment of the present invention.

FIG. 3 shows a transparent, side view of a laser system including a laser chamber and rail assembly according to another embodiment of the present invention. Rail assembly 309 is shown in solid lines in FIG. 3 in an extended, lowered position which allows laser chamber 305 to be placed on a service cart 330 for moving the laser chamber to a service area.

One difference between rail assembly 309 of FIG. 3 and rail assembly 209 of FIG. 2 that the opposing rail structures on each side of the laser housing of FIG. 3 each include two hinges (with hinges 313 and 314 shown for the rail structure of FIG. 3). Hinge 314 is designed such that it can only pivot by 90 degrees whereas hinge 313 is designed to pivot by 270 degrees. Another difference is that with the rail assembly of FIG. 3, the rails of the rail structures do not slide with respect to the housing. On the other hand, the rail assembly in FIG. 2 is more compact and takes up less space in the housing when not in use as opposed to the rail assembly of FIG. 3.

Referring back to FIG. 3, to move chamber 305 to an operating position residing within housing 303 from its position shown in FIG. 3, the curved rails (with curved rail 311 shown) are pivoted 90 degrees clockwise (relative to the view shown in FIG. 3) to position 326, shown in phantom, to raise laser chamber 305. From this position, rotating bearings (with 319 shown) allow the laser chamber 305 to be rolled on the opposing rail structures towards its operating position located in housing 303.

To retract rail assembly 309 to its retracted position 325 (shown in phantom), the curved rails (311 shown) are rotated 90 degrees on the exterior hinges (hinge 313 shown) clockwise from position 326 shown in phantom to a position where the curved rails extend upwards. The intermediate rails (with 312 shown) and associated curved rails (curved rail 311 is associated with intermediate rail 312) are pivoted 90 degrees clockwise on the interior hinges (with 314 shown) to position 325 where rail assembly 309 is in its retracted position. The interior rails (with 316 shown) are fixably attached to structures (not shown) such as frame members of housing 203.

The curved rails (with curved rail 311 shown) are designed such that the ends of the curve portions (end 333 for curved rail 311) extend out past the center line 343 of the rotating bearings (319 shown) of laser chamber 305 such that laser chamber 305 does not roll off of the curved rails during installation or removal. The rotating bearings (with 319 shown) are located on laser chamber 305 with sufficient clearance 341 so as to allow the end portions (with end 333 shown) of the curved rails (with 311 shown) to extend between the rotating bearings and the top of service cart 330 when the rail assembly 309 is in the lowered position as shown in solid lines. Thus, laser chamber 305 is not required to be manually lifted from cart 330 during its installation.

The rail assembles shown in FIGS. 2 and 3 are both retractable and extendible from the housing and can reside within the housing when not in use. Thus, a technician installing or removing the laser chamber does not need separate tools to assemble the rail assembly or does not need to bring portions of the rail assembly to the housing to install or remove the chamber.

Figure 4A:
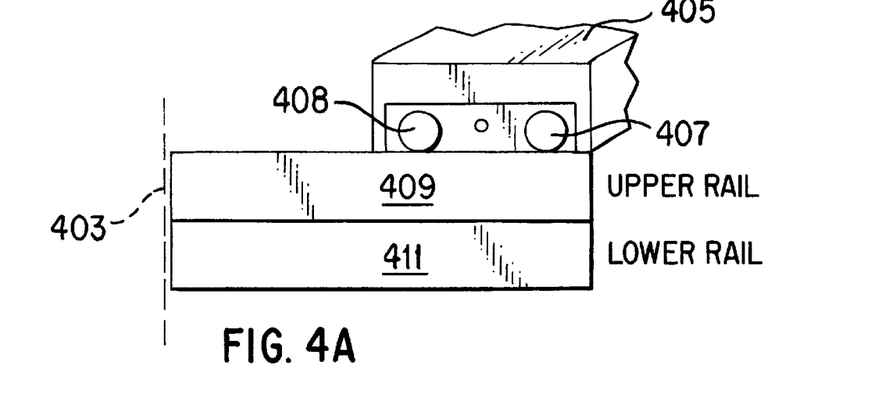
FIGS. 4A, 4B, and 4C are side views showing the movement of a laser chamber along a rail assembly from an operating position to a position located outside of a laser system housing according to one embodiment of the present invention.
Figure 4B:
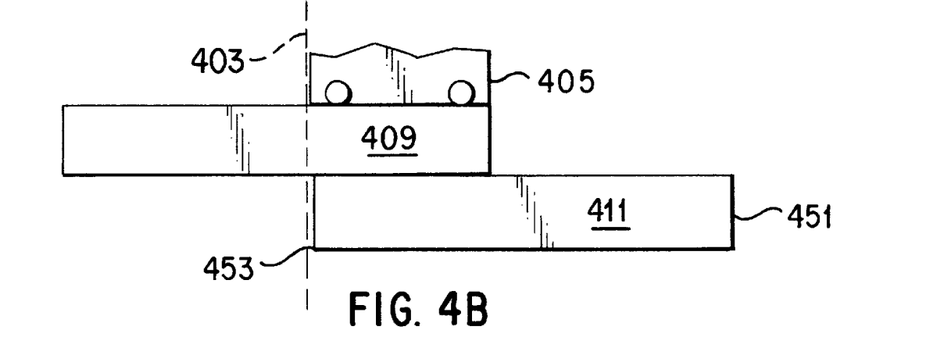
Figure 4C:
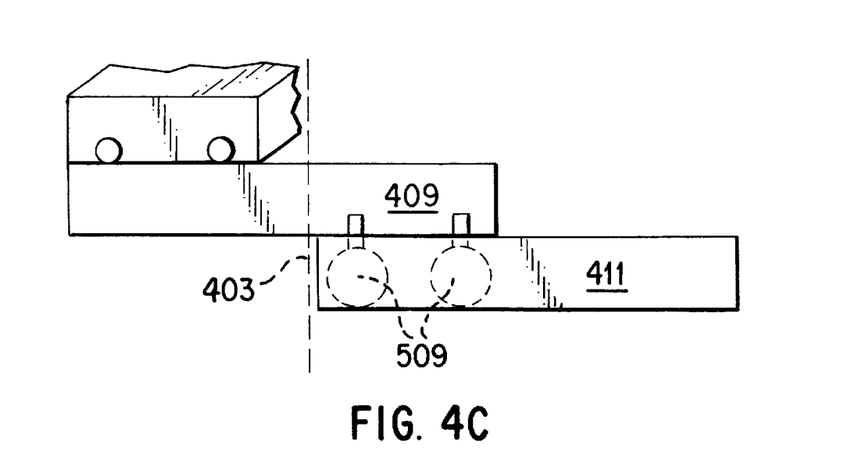

FIGS. 4A, 4B, and 4C show a portion of a rail assembly having rails that move laterally with respect to one other to extend and retract the rail assembly. Laser chamber 405 includes two rotating bearings or wheels 407 and 408. Two other rotating bearings or wheels (not shown) are located on the opposing side of laser chamber 405. Also not shown in FIGS. 4A–4C is the opposing rail structure located on the opposite side of housing 403.

Figure 5:
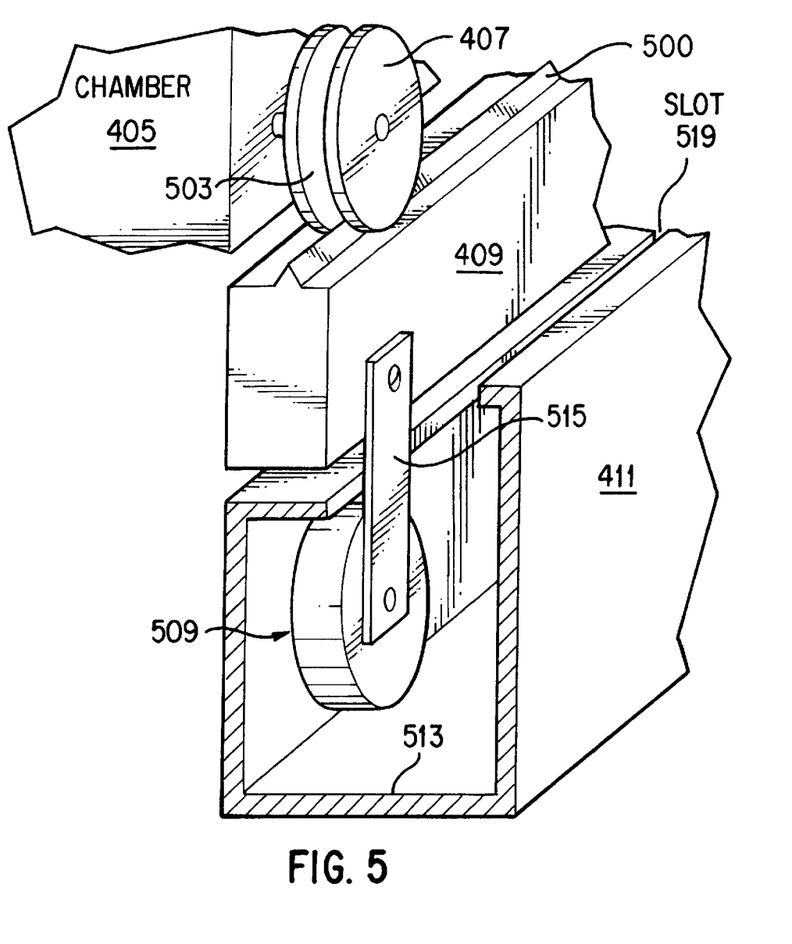
FIG. 5 is a perspective, cut-away view of a portion of a rail structure according to one embodiment of the present invention.

FIG. 5 shows a perspective, cut-away view of the rail structure shown in FIGS. 4A–4C. Rotating bearing 407 on laser chamber 405 includes a groove 503 that corresponds to ridge 505 located on the top of upper rail 409. The corresponding groove 503 and ridge 505 act to keep the chamber 405 from moving sideways during the movement of chamber 405.

Rotatably coupled to upper rail 409 are two captured wheels 509 that reside and travel within lower rail 411. The upper rail (not shown) of the opposing rail structure also includes two captured wheels (not shown). The weight of the upper rails (and correspondingly the laser chamber) is supported on the captured wheels. When upper rail 409 moves laterally with respect to lower rail 411, captured wheels 509 roll along the top interior side of lower wall 513 of lower rail 411. Wheel 509 is rotatably coupled to upper rail 409 by a bar 515. Bar 515 moves in a slot 519 of lower rail 411 when upper rail 409 is moving laterally with respect to lower rail 411. In addition to supporting the weight of upper rail 409, the captured wheel-bar structures serve to prevent upper rail 409 from moving sideways during upper rail 409 sliding with respect to lower rail 411.

In FIG. 4A, laser chamber 405 is shown in its operating position residing within housing 403. To move laser chamber 405 to a position outside housing 403 (such as shown in FIG. 4C), the upper rails (409 for the rail structure shown) are moved outward from housing 403 (to the left relative to the view shown in FIG. 4A) to the position shown in FIG. 4B. Laser chamber 405 is then rolled on the upper rails to its position shown in FIG. 4C. Although upper rail 409 is shown in FIGS. 4A–4C as being a straight rail, the upper rails may also be curved similar to rail 211 shown in FIG. 2.

Referring back to FIG. 4C, captured wheels 509 also prevent upper rail 409 from tipping forward when the rail assembly is in an extended position and the laser chamber is positioned at the exterior portion of the rail assembly. In FIG. 4C, captured wheels 509 are shown in phantom.

Although FIGS. 4A–4C show the individual rails (409 and 411) of a rail structure being located on top of each other, those of skill in the art will appreciate, based upon the teachings herein, that the individual rails may extend out and retract from each other in a "retracting telescope-like" arrangement. With such an arrangement, the furthest extending rail would be slightly smaller (or slightly larger) than the rail from which it extends. In a retracted position, the furthest extending rail would reside within the rail from which extends (or vice versa). With other rail structures, the individual rails may reside along side each other when retracted.

Referring back to FIGS. 4A–4C, a rail structure may include intermediate rails that move laterally with respect to the rails above and below. For example, the rail structure shown in FIGS. 4A-4C may include an intermediate rail (not shown) positioned between rail 409 and rail 411. This intermediate rail would move laterally with respect to lower rail 411 and would move laterally with respect to upper rail 409 to allow the rail structure to extend further out from laser system housing 403.

Because a laser chamber can weigh in excess of 140 pounds, the laser systems of FIGS. 1, 2, and 3 may each include an actuator or actuators for providing actuator controlled movement of the laser chamber in a direction having a vertical component to raise and lower the laser chamber during its installation and removal from the laser housing.

Figure 6:
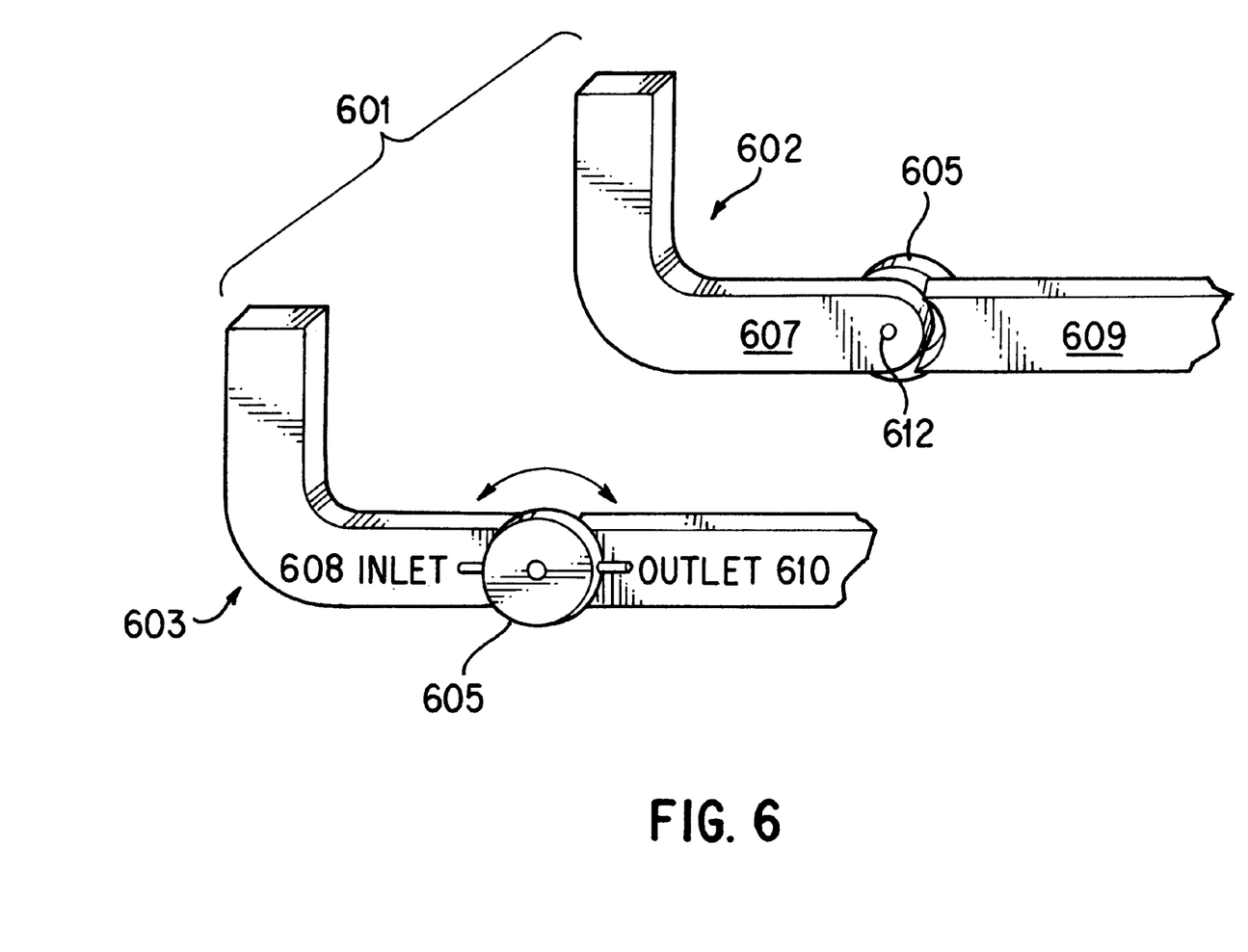
FIG. 6 is a perspective view of a portion of a rail assembly including rotary type actuators according to one embodiment of the present invention.

Referring to FIG. 6, a rotary actuator 605 is one type of actuator that can be used to provide a laser system with actuator controlled movement of the laser chamber. Rotary actuators 605 are pneumatically controlled. One type of pneumatically controlled rotary actuator that may be used is the NCRB 100 sold by SMC PNEUMATICS, INC. of Indianapolis Ind. Other types of rotary actuators may also be used include a hydraulic rotary actuator as well as electrical rotary actuators.

Rotary actuators 605 are located on the outer sides of opposing rail structures 602 and 603 of rail assembly 601. Rotary actuators 605 each include an inner cylinder and an outer cylinder that, when activated, rotate with respect to each other to provide a pivotal force on objects fixably coupled to each cylinder. When activated, actuators 605 cause the curved rails 607 and 608 to pivot or pivotally move with respect to straight rails 609 and 610, respectively. With one type of rotary actuator, a positive pressure differential between the inlet and outlet forces the rotary actuator to pivot in one direction and a negative pressure differential between the inlet and outlet forces the rotary actuator to pivot in the other direction. The inlets and outlets are connected to air hoses (not shown) that provide pressurized air for creating the appropriate pressure differentials. Solenoid valves are used to control the air pressures at the inlets and outlets. The air hoses may be located on the outer sides of the rails or in the interior of straight rails 609 and 610. The control switch for controlling the pressure differentials in the actuators may be located on the interior side or exterior side of the laser chamber housing. With some systems, both the inlet and outlet are connected to pressurized lines. With other systems, the inlet is connected to a pressurized line and the outlet is connected to a vented line via a solenoid.

Actuators 605 may also include limit switches or be set to limit the pivotal motion of the actuator within a limited range of radial movement. Referring back to FIG. 2, an actuator located at hinge 213 would be pivotal by 180 degrees from the position of curve rail 211 shown in FIG. 2 to a position similar to that of the curve rail 311 shown in FIG. 3.

An advantage of using a rotary type actuator is that the actuator is compact, allowing for it to be easily retracted and extended with the rail assembly. For example, straight rail 610 can be an upper rail (similar to rail 409 of FIGS. 4A–4C) that moves laterally (with curved rail 603) along a lower rail (not shown) to extend and retract the rail assembly. With such as system, the rotary actuator can be easily extended and retracted with the rail assembly.

Another advantage of a rotary actuator is that it allows for an actuator controlled pivotal movement of the curved rail by over 270 degrees with respect to the straight rail.

Referring back to FIG. 3, to raise chamber 305, actuators located at hinge 313 and at the hinge on the opposing rail structure (not shown) are each activated to provide a force to pivot the curved rails (311 on the rail structure shown) clockwise by 90 degrees with respect to the straight intermediate rails (item 312 on the rail structure shown) to cooperatively raise chamber 305 to an elevation that is equal to or slightly higher than the elevation of its operating position. At such a position, chamber 305 is rolled on the opposing rail structures to its operating position where conventional hookups and securing operations are made before operating. After laser chamber 305 is installed, to retract rail assembly to its retracted position within housing 303, the actuators are activated to pivot the curved rails by 90 degrees clockwise such that the curved rails (311 for the rail structure shown) extend upward from the hinges (313 for the rail structure shown). The intermediate rails (312 for the rail structure shown) along with the curve rails are manually pivoted clockwise by 90 degrees on the interior hinges (hinge 314 shown) to place the rail assembly in its retracted position 325 within the housing.

Referring back to FIG. 2, to remove chamber 205 from housing 203, the rail assembly 209 is manually pulled outward to where the hinges (213 for the rail structure shown) are at its position shown in phantom. Rotary type actuators located at the hinges (213 for the rail structure shown) are activated to pivot the curve rails 90 degrees counter clockwise to the extended position shown in phantom on FIG. 2. The laser chamber is then rolled on the rail structures (209 shown) to a position outside of the housing 203 as shown in phantom. The actuators are then activated to provide forces on the curved rails to cooperatively, controllably lower the chamber 203. The resultant upward component of the forces provided by the actuators during the lowering of the chamber is cooperatively slightly less than the opposing force of gravity such that the chamber is lowered at a slow or deliberate rate (or rates) during the lowering.

The rates at which a laser chamber is raised or lowered during installation or removal may vary throughout the raising or lowering process. For example, during the raising of the laser chamber, the initial rate of movement may be faster than the rate of movement as the laser chamber approaches an elevation where it can be rolled to its operating position (such as shown in FIG. 2). Varying the rate of movement is accomplished by varying the pressure differential during the raising or lowering of the chamber. Slowing the raising (or lowering) at the end of the operation allows for the laser chamber to be quickly, yet controllably raised or lowered.

Some laser systems may include a microcontroller (not shown) for controlling the raising and lowering of the laser chamber. The outputs of the microcontroller are electrically coupled to electromechanical solenoids that control the air pressure of the pneumatic lines connected to the inlets and outlets of the actuators. The rate of movement of the actuators are controlled by varying the pressure differential between the inlets and outlets. The appropriate pressure differential patterns for both the raising and lowering of the laser chamber would be programmed into the microcontroller. Such a system may also include electrical position switches that provide signals back to the microcontroller indicating the position of the rail assembly. Mounted to the housing are switches for controlling which operation (raising or lowering) is to be performed. One type of microcontroller that may be used is the RLC MAGNUM microcontroller sold by RLC ENTERPRISES of Atascadero, Calif.

For some laser systems having actuators on opposing rail structures (such as shown in FIG. 6), the air pressure of the inlets of each actuator are controlled by a first solenoid and the air pressure of the outlets of each actuator are controlled by a second solenoid such that the pressure differential across both solenoids is approximately the same. Therefore, the rate of movement of the two solenoids is approximately the same as well.

Figure 7:
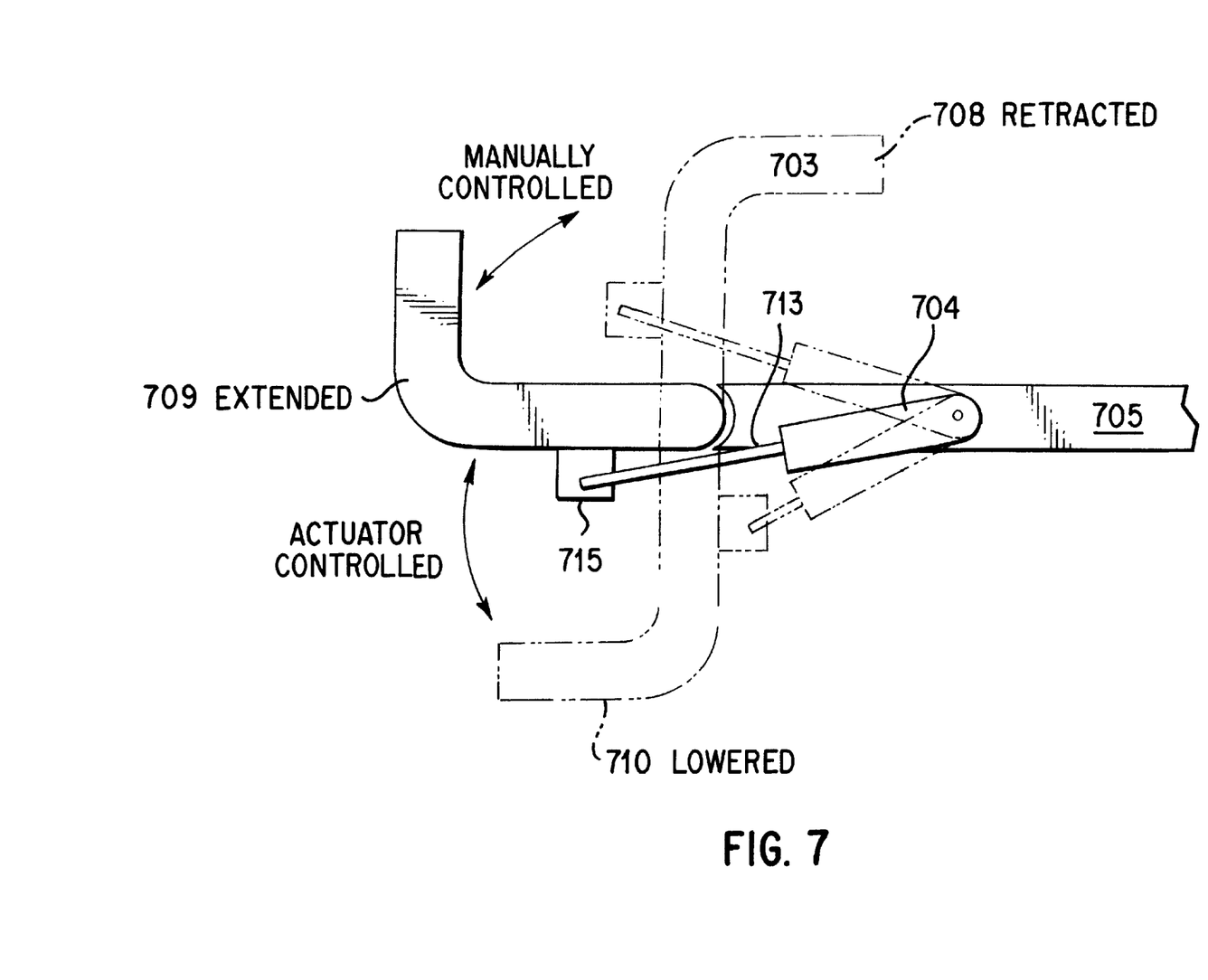
FIG. 7 is a side view of a portion of a rail assembly including a piston type actuator according to one embodiment of the present invention.

Referring to FIG. 7, another type of actuator that is used to provide a force for actuator controlled raising or lowering of a chamber is a piston type actuator. When activated, the rod (cylinder arm) of the piston type actuator retracts or extends with respect to the cylinder. Examples of piston type actuators that may be used with the present invention include a pneumatic piston actuator, a hydraulic piston actuator, or an actuator with an electric motor and corresponding gear structure.

In FIG. 7, curve rail 703 is shown in three positions, a retracted position 708, an extended position 709, and an extended, lowered position 710. Cylinder arm 713 is pivotally attached to a tab 715 which is fixably attached to curved rail 703. The other end of actuator 704 is pivotally attached to straight rail 705. Not shown are the flexible air hoses connected to the inlet and outlet of cylinder actuator 704. Attaching the cylinder end of actuator 704 to straight rail 705 allows the cylinder actuator to "travel" with rail 705 when rail 705 is slid back to its retracted position (to the right relative to the view shown in FIG. 7) with a laser system housing (not shown). However, the cylinder end may be fixably attached to a structure of the laser system housing.

Actuator 704 is activated to move curved rail 703 between extended position 709 and lowered position 710. When the curved rail is in extended position 709, activating actuator 704 to retract cylinder arm 713 provides a force on curve rail 703 so that curved rail 703 is moved to the lowered position 710 to controllable lower a laser chamber. When curved rail 703 is in the lowered position 710, activating the actuator to extend cylinder arm 713 provides a force on curve rail 703 to move curve rail 703 to extended position 709 to raise a laser chamber.

Curved rail 703 is manually pivoted with respect to straight rail 705 to move curved rail 703 between its retracted 708 and extended 709 positions. During the movement of curved rail 703 between extended 709 and retracted 708 positions, the length of the portion of cylinder arm 713 extending from actuator cylinder 704 does not change length thereby allowing curved rail 703 to be manually moved between the retracted and extended positions without activating actuator 704.

Figure 8:
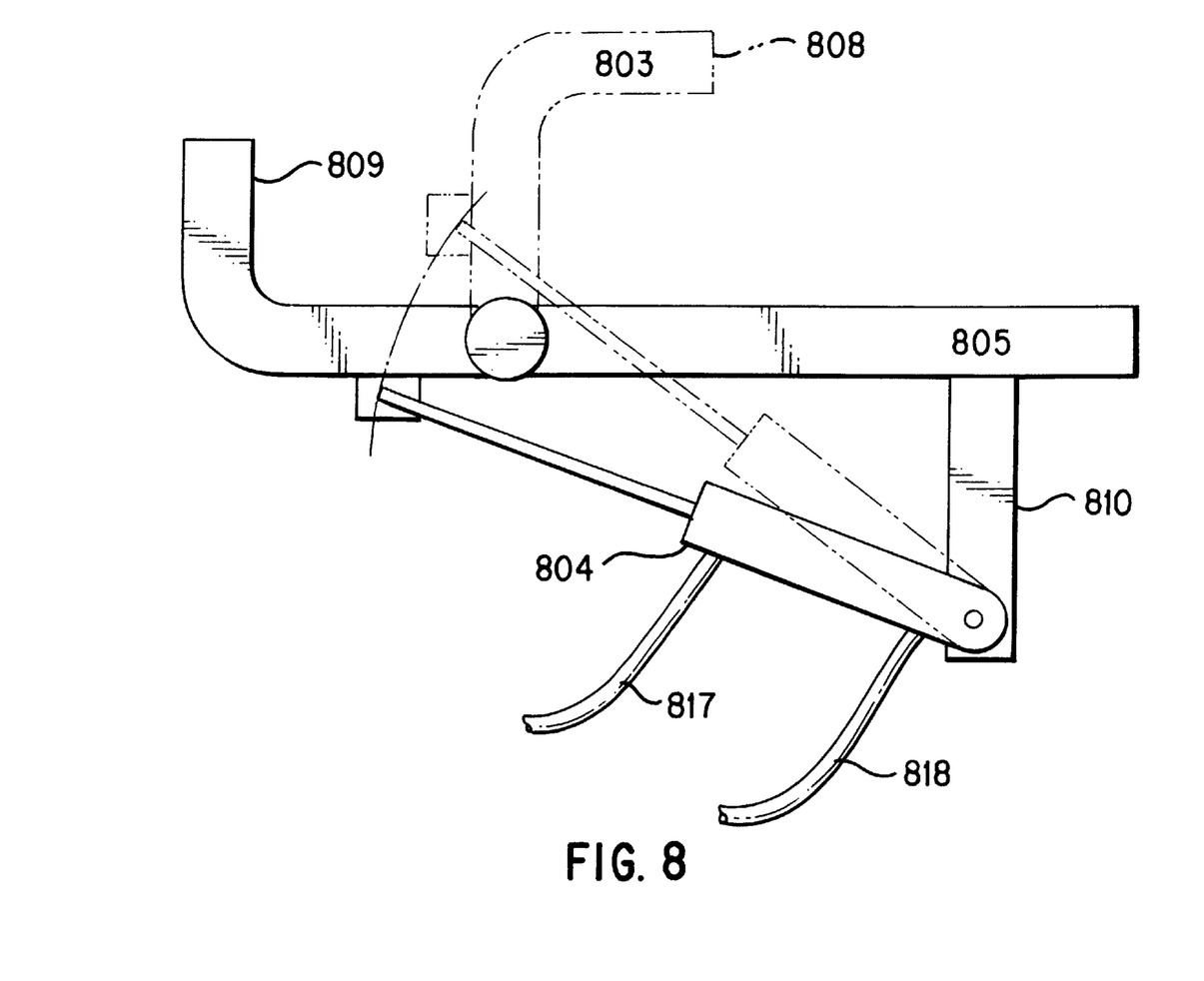
FIG. 8 is a side view of a portion of a rail assembly including a piston type actuator according to one embodiment of the present invention.

FIG. 8 shows a partial side view of a rail structure according to one embodiment of the present invention. The cylinder end of actuator 804 is pivotally coupled to straight rail 805 via a bar 810 that allows actuator 804 to travel with straight rail 805 when being retracted or extended from the laser system housing and yet allowing actuator 804 to be positioned to allow the curved rail 803 to be manually pivoted between its retracted position 808 and extended position 809 without activating actuator 804. Also shown in FIG. 8 are pressurized air hoses 817 and 818 connected to the inlet and outlet of cylinder actuator 804.

Figure 9:
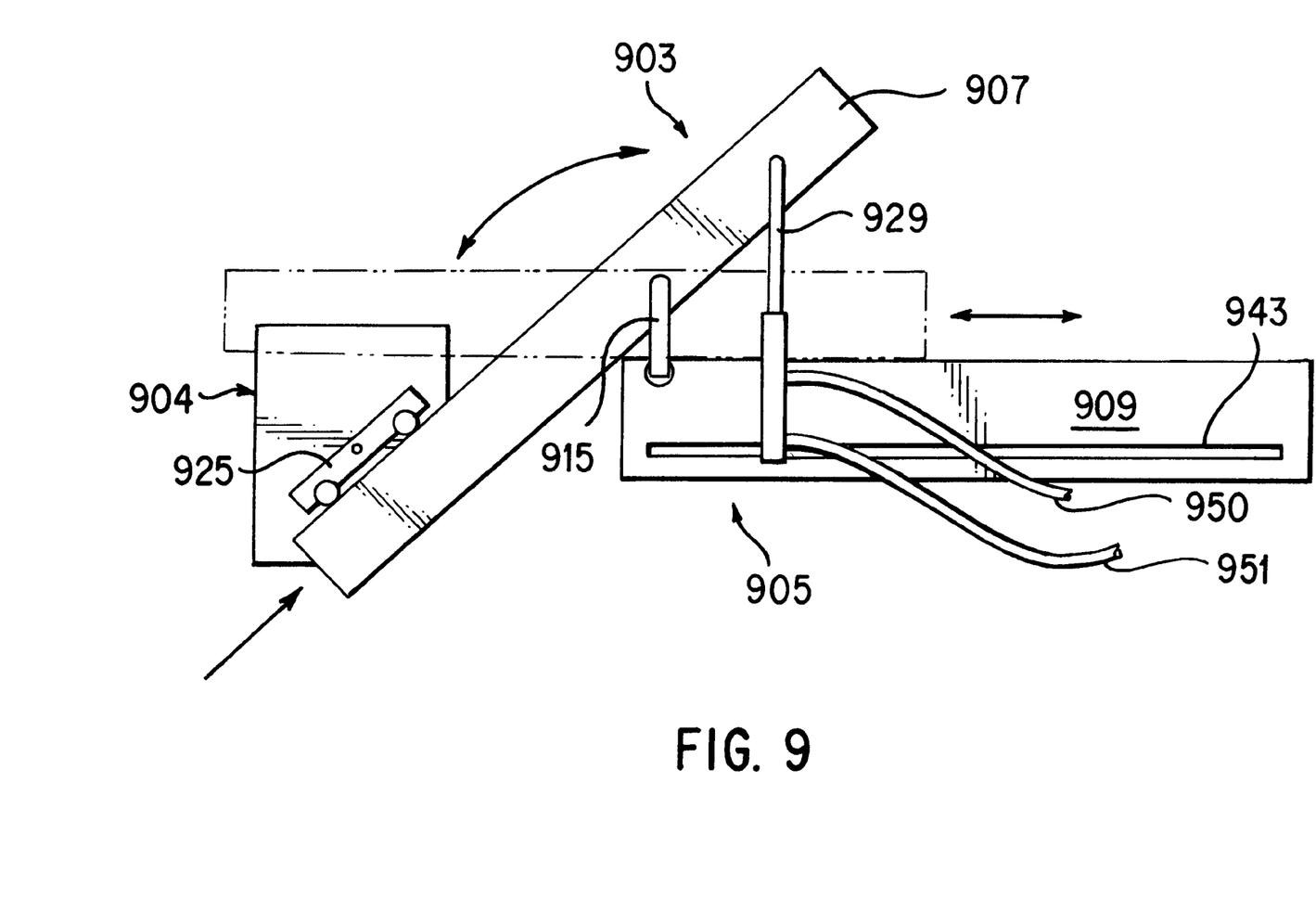
FIG. 9 is a side view of a portion of a rail assembly including a piston type actuator according to one embodiment of the present invention.

FIG. 9 shows a side view of a rail assembly according to another embodiment of the present invention. Rail assembly 903 includes two rail structures (rail structure 905 and an opposing rail structure not shown). Each rail structure includes and upper rail (upper rail 907 for rail structure 905) and a lower rail (lower rail 909 for rail structure 905). The lower rails are fixably coupled to the laser system housing (not shown). The upper rails slide with respect to lower rails between extended and retracted positions. When in an extended position shown in FIG. 9, the upper rails are pivoted with respect to the lower rails on hinge 915 to cooperatively raise and lower laser chamber 904 positioned at the exterior ends of the upper rails. Coupled to the upper and lower rails are pneumatic piston cylinder actuators (929 shown) that provide forces on the upper rails to control the pivotal movements of the upper rails with respect to the lower rails to cooperatively raise and lower laser chamber 904. Connected to the inlet and outlet of actuator 929 are pressurized air hoses 950 and 951. Laser chamber 904 includes a pivotally attached roller base 925.

To move chamber 904 from its position shown in FIG. 9 to an operating position residing within the laser system cabinet (not shown), the cylinder rods of the cylinder actuators retract to provide a force upon the upper rails, each rotating the respective upper rail clockwise, relative to the view shown in FIG. 9, to cooperatively raise laser chamber 904 from its position shown in FIG. 9 to a position where the upper rails are generally horizontal as shown in phantom. Attaching devices such as clamps, screws, or straps (not shown) that secure the laser chamber wheel base 925 to the exterior ends of the upper rails are released to allow laser chamber 904 to be rolled back to the interior side edges (right side edges) of the upper rails, relative to the view shown in FIG. 9. The upper rails (907 shown) are then slid back into the cabinet thereby to cooperatively move chamber 904 back towards its operating position in the cabinet.

The lower rails each include a track (943 shown for lower rail 909) that allow the respective piston cylinder actuator (929 shown) to slide towards the interior of the laser housing when the upper rails are being slid inward.

Although in FIGS. 2–9, the laser chamber's rotating bearings or wheels are shown riding on a top portion of the rails of the rail assembly (see FIG. 5), based upon the teachings herein, those skilled in the art will appreciate that the rotating bearing or wheels may ride on other portions of the rails. An example of such a rail assembly would include two opposing C channel rails or two opposing L channel rails where the wheels would ride on the lower, inward facing portions of such rails.

With other laser systems, the rail assembly may include a single rail structure (as opposed to two opposing rail structures) for supporting the laser chamber during the installation and removal of the laser chamber. The single rail structure may be located in the middle of a laser chamber compartment of the laser housing. The single rail structure may extend out from the bottom of the laser chamber compartment such that the laser chamber would be positioned above the rail structure during installation or removal, or the rail structure would be located at the top of the laser housing where the chamber would hang from the rail structure during installation and removal.

Other laser rail assemblies would include a tray structure having wheels, rotating bearings, or being generally slideable on corresponding rails coupled to the laser system housing. The laser chamber would reside in the tray during the installation and removal of the laser system.

Other rail assemblies that incorporate opposing rail structures may include a horizontal member (or equivalent structure) that fixably couples at least portions of the opposing rail structures together. Referring back to FIG. 6, a horizontal member may fixably couple rail 607 with rail 608 such that a force on one rail (607 or 608) would also be transferred to the other rail thereby enabling the movement of rails 607 and 608 to be made with a single actuator instead of two actuators as shown in FIG. 6.

For other rail assemblies, each opposing rail structure would be pivotally coupled at one end to the laser system housing. Piston cylinder actuators would be attached to portions of the rail structures at locations adjacent to the front side opening of the laser system housing. The other ends of the actuators would be physically coupled to structures of the housing at locations located above (or below) the rail structures. Activating an actuator would rotate the entire rail structure around its pivotally coupled end, thereby raising or lowering the other end of the rail structure that extends out from the housing. For example, referring back to FIGS. 4A–4C, the interior end 451 of lower rail 411 would be pivotally coupled to housing 403 and the exterior end 453 of rail 411 would be coupled to an actuator (not shown). Activating the actuator would rotate end 453 with respect to end 451 thereby raising or lowering laser chamber 405 when chamber 405 is in the position as shown in FIG. 4C.

Those skilled in the art will appreciate that based upon the teachings herein, specific features of a particular rail assembly and corresponding actuator(s) shown or described in any one of FIGS. 1–9 or the text may be implemented in the other rail assemblies and corresponding actuator(s) shown in the other drawings of FIGS. 1–9 or described in the text. For example, rail assembly 903 may be modified where the exterior ends of the upper rails (905 shown) are curved (similar to those in FIG. 6) thereby allowing the laser chamber to move within the curved portions during the raising and lowering of the laser chamber. Also, rail 212 of FIG. 2 may move laterally between retracted and extended positions on a lower rail in a similar manner to rail 409 shown in FIGS. 4A–4C.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A laser system comprising:
   a housing for housing a laser chamber;
   a rail assembly physically coupled to the housing, the rail assembly being extendible and retractable between a retracted position, where the rail assembly resides at least substantially within the housing, and an extended position, where the rail assembly extends out from the housing such that the rail assembly provides support for a laser chamber at a location in which the laser chamber is at least substantially outside of the housing.
   wherein the rail assembly is positionable in an extended position to provide support for a laser chamber at a location in which the laser chamber is at least substantially outside of the housing and in which the laser chamber is at a lower elevation than a location wherein it resides within the housing.

2. The laser system of claim 1 further comprising:
   an actuator, the actuator providing a force on at least a portion of the rail assembly for controlling the movement of the at least the portion of the rail assembly to move the chamber in a direction having a vertical component.

3. The laser system of claim 2 further comprising:
   a second actuator, the second actuator providing a force on at least a portion of the rail assembly for controlling the movement of the at least the portion of the assembly to move the chamber in a direction having a vertical component cooperatively with the first actuator.

4. The laser system of claim 1 wherein the rail assembly provides support for a laser chamber during movement of the laser chamber between a position where the laser chamber resides within the housing and a position where the laser chamber is at least substantially outside of the housing.

5. The laser system of claim 4 wherein the position where the laser chamber resides within the housing is at a higher elevation that the position where the laser chamber is substantially outside of the housing.

6. The laser system of claim 1 further comprising:
   a laser chamber defining a cavity, wherein gasses are injected into the cavity and excited to produce a laser beam.

7. The laser system of claim 1 further comparing:
   a laser chamber including at least one rotating structure for rolling on a portion of the rail assembly between a position where the laser chamber resides within the housing and a position where the laser chamber is at least substantially outside the housing.

8. The laser system of claim 1 wherein the rail assembly includes:
   a first and a second opposing rail structures, each rail structure extendible and retractable between retracted positions and fully extended positions.

9. The laser system of claim 1 further comprising:
at least one hinge, wherein retracting the rail assembly from an extended position to a retracted position includes pivotally moving at least a portion of the rail assembly with respect to the housing on the at least one hinge.

10. The laser system of claim 1 wherein said rail assembly is slideable with respect to the housing, wherein retracting the rail assembly from an extended position to a retracted position includes sliding at least a portion of the rail assembly into the housing.

11. The laser system of claim 1 wherein the rail assembly is in a retracted position when not in use.

12. A laser system comprising:
a laser chamber;
a housing for housing the laser chamber;
an actuator physically coupled to the housing, the actuator providing a force for controlling the movement of the chamber in a direction having a vertical component during the installation or removal of the laser chamber with respect to the housing.

13. The laser system of claim 12 wherein the system for removing and installing further includes:
a rail assembly physically coupled to the housing, the rail assembly providing support for the chamber in the movement of the chamber between a position where the laser chamber is within the housing and a position where the laser chamber is at least substantially outside of the housing.

14. The laser system of claim 13 wherein:
the actuator provides a force on at least a portion of the rail assembly for controlling the movement of the chamber in a direction having a vertical component during the installation or removal of the laser chamber.

15. The laser system of claim 13 wherein the rail assembly includes at least one rail structure having a curved extended end thereby allowing the laser chamber to move within the curved portion during the movement of the chamber in a direction having a vertical component.

16. The laser system of claim 12 further comprising:
a second actuator physically coupled to the housing, the second actuator providing a force for controlling the movement of the chamber in a direction having a vertical component cooperatively with the actuator during the installation or removal of the laser chamber.

17. The laser system of claim 12 wherein the actuator includes a pneumatic cylinder.

18. The laser system of claim 12 wherein the actuator includes a hydraulic cylinder.

19. The laser system of claim 12 wherein the actuator includes a rotary type actuator.

20. The laser system of claim 12 further comprising:
a second actuator;
the rail assembly further includes:
a first opposing rail structure and a second opposing rail structure each having a first portion and a second portion;
wherein the actuator provides a force upon the first rail structure to pivot the first portion with respect to the second portion of the first rail structure and the second actuator provides a force upon the second rail structure to pivot the first portion with respect to the second portion of the second rail structure to cooperatively move the chamber in a direction having a vertical component.

21. The laser system of claim 12 wherein the actuator includes a piston type actuator.

22. The laser system of claim 12 further comprising:
a rail assembly physically coupled to the housing, the rail assembly providing support for the chamber in the movement of the chamber during installation or removal, the rail assembly having a first portion and a second portion, the actuator providing a force upon the rail assembly to pivot the first portion with respect to the second portion to move the chamber in a direction having a vertical component.

23. The laser system of claim 12 wherein the actuator includes an electric motor.

24. The laser system of claim 12 wherein the actuator is positionable to reside within the housing when not in use.

25. Method for moving a laser chamber with respect to a laser system housing, the method comprising:
moving the laser chamber supported by a moveable assembly coupled to the housing from its operating position in the housing towards an outside of the housing;
lowering the chamber, using the moveable assembly, from a first elevation to a second elevation wherein at least one actuator physically coupled to the assembly provides a force to controllably lower the chamber.

26. The method of claim 25 further comprising:
raising the chamber from a lower elevation to the first elevation during its installation in the housing, the at least one actuator providing a force to raise the chamber.

27. The method of claim 25 wherein the moving the laser chamber from its operating position includes providing support for the laser chamber by a rail assembly physically coupled to the housing.

28. The method of claim 27 wherein moving the laser chamber on the rail assembly includes rolling the chamber on the rail assembly.

29. The method of claim 27 wherein moving chamber includes extending the rail assembly out from the housing.

30. The method of claim 29 wherein extending the rail assembly moves the chamber.

31. The method of claim 29 wherein extending the rail assembly includes pivotally moving at least a portion of the rail assembly with respect to the housing.

32. The method of claim 27 further comprising:
retracting the rail assembly to a position residing within the housing.

33. A laser system comprising:
a housing; and
a means physically coupled to the housing for providing for the movement of a laser chamber between a location within the housing and a location at least substantially outside of the housing during the installation or removal of the laser chamber, wherein the location at least substantially outside the housing is at a lower elevation than the location inside the housing.

34. The laser system of claim 33 wherein a portion of the movement has a vertical component being actuator controlled.

* * * * *